Figure 1:
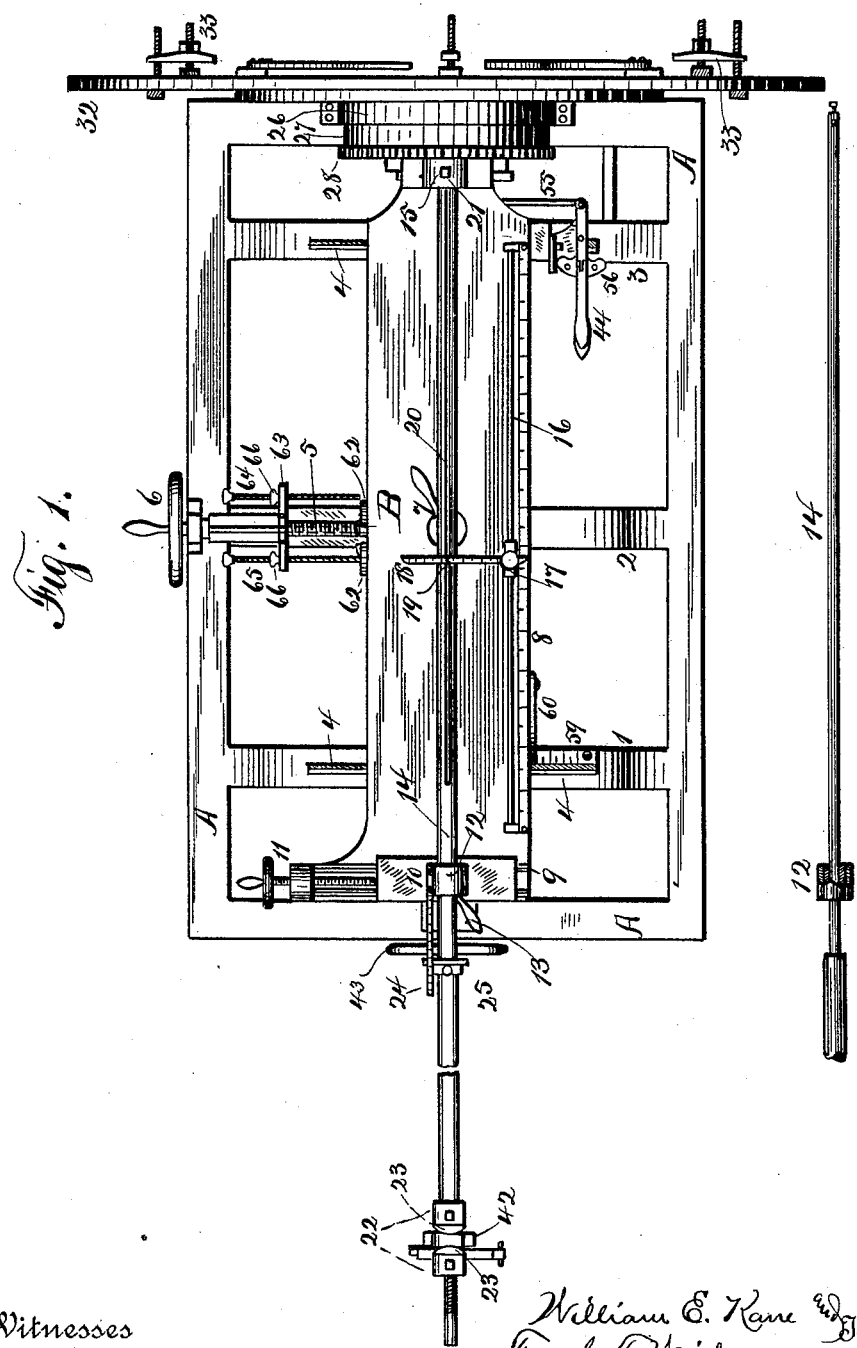

(No Model.) 4 Sheets—Sheet 1.

W. E. KANE & F. T. WEIDAW.
HUB BORING MACHINE.

No. 422,358. Patented Feb. 25, 1890.

Witnesses
H. P. Denison
Frank D. Emery

Inventors
William E. Kane
Frank T. Weidaw

By their Attorneys
Smith & Denison (No Model.) 4 Sheets—Sheet 2.
W. E. KANE & F. T. WEIDAW.
HUB BORING MACHINE.
No. 422,358. Patented Feb. 25, 1890.
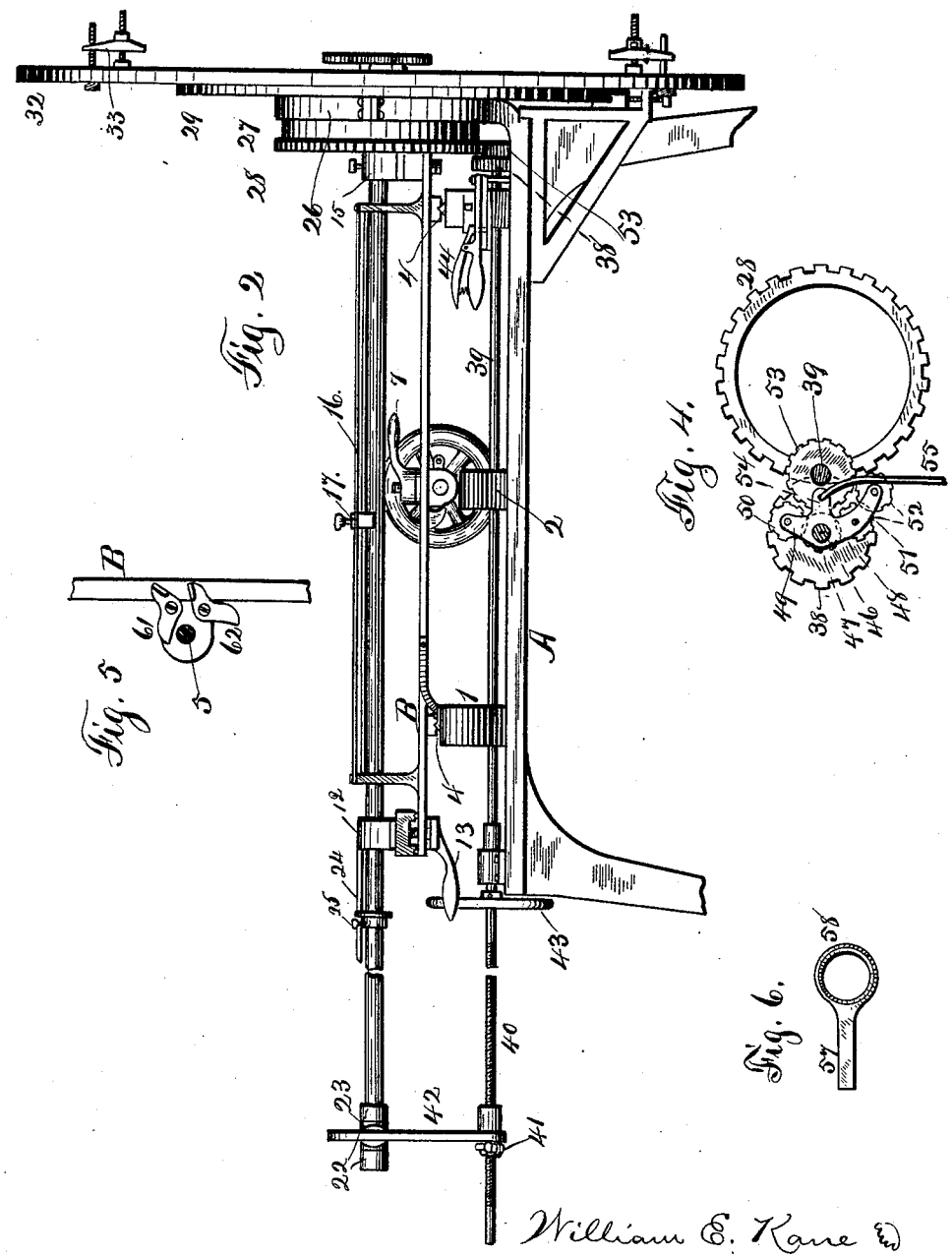
Witnesses
H. P. Denison
Frank D. Emny
William E. Kane
Frank T. Weidaw
Inventors
By their Attorneys
Smith & Denison (No Model.) 4 Sheets—Sheet 3.
W. E. KANE & F. T. WEIDAW.
HUB BORING MACHINE.
No. 422,358. Patented Feb. 25, 1890.
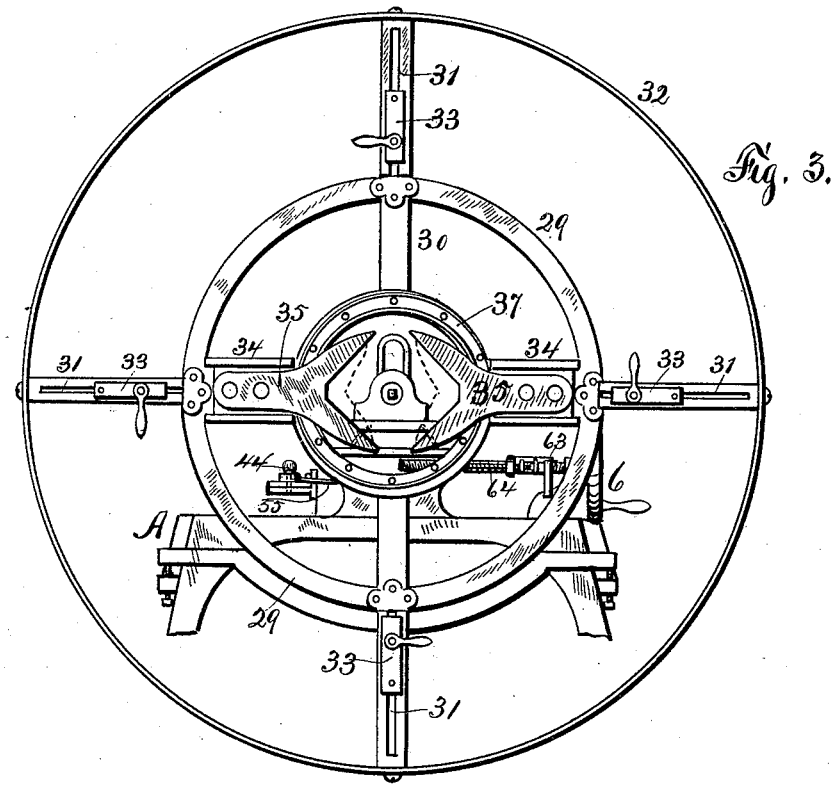
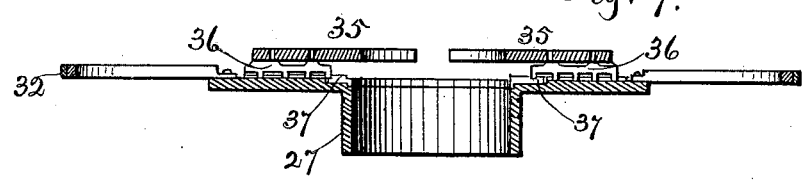
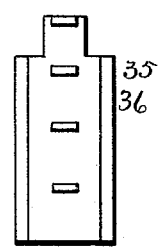
Witnesses
N. P. Denison
Frank D. Ewing
William E. Kane } Inventors
Frank T. Weidaw
By their Attorneys
Smith & Denison (No Model.) 4 Sheets—Sheet 4.
W. E. KANE & F. T. WEIDAW.
HUB BORING MACHINE.
No. 422,358. Patented Feb. 25, 1890.
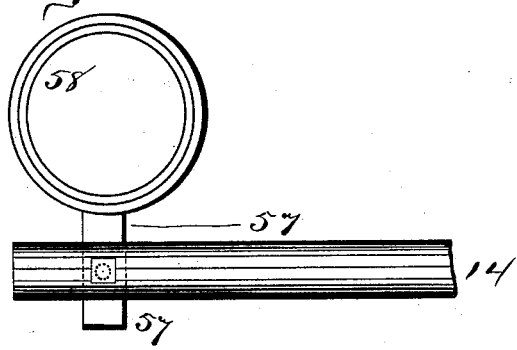
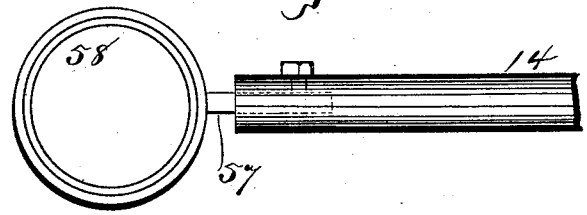
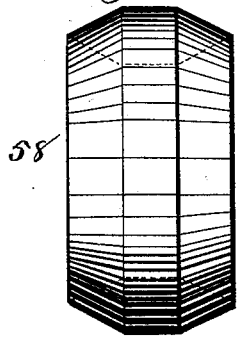 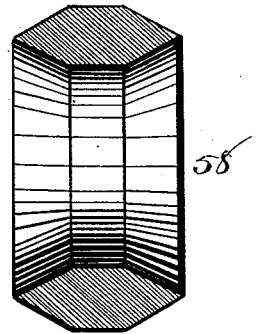

UNITED STATES PATENT OFFICE.

WILLIAM E. KANE AND FRANK T. WEIDAW, OF SYRACUSE, ASSIGNORS OF ONE-THIRD TO WILLIAM F. MORRIS, OF BALDWINSVILLE, NEW YORK.

HUB-BORING MACHINE.

SPECIFICATION forming part of Letters Patent No. 422,358, dated February 25, 1890.

Application filed April 17, 1889. Serial No. 307,558. (No model.)

*To all whom it may concern:*

Be it known that we, WILLIAM E. KANE and FRANK T. WEIDAW, of Syracuse, county of Onondaga, in the State of New York, citizens of the United States, have invented certain new and useful Improvements in Hub-Boring Machines, of which the following is a specification, reference being had to the accompanying drawings, in which—

Figure 1 is a top plan view. Fig. 2 is a side elevation. Fig. 3 is a front elevation. Fig. 4 is a plan view of the reverse feed mechanism detached. Fig. 5 is a side elevation of the edge of the table in part, with the buttons which engage with the set-screws which control and regulate the side movement of the boring-bar table or carriage. Fig. 6 is a plan view of the cutting-knife detached. Fig. 7 is a vertical section of the hub-ring, gripping-jaws, and the scroll and slot mechanism operating the jaws. Fig. 8 is a bottom plan view showing the slots and studs upon the inner faces of the gripping-jaws. Fig. 9 is a rear elevation of a gripping-jaw. Fig. 10 is a side elevation of the boring-bar and the knife inserted or standing transversely to the bar. Fig. 11 is a view of the same with the knife-shank inserted into the end of the boring-bar. Fig. 12 is a side elevation of the knife, showing the double bevel. Fig. 13 is a vertical transverse section of the knife.

Our invention relates to hub-boring machines operated either by hand or power and in which the boring-tool is automatically fed into and through the hub, the hub rotating while the tool does not, and which are adapted to bore either a straight hole, a swell, or taper, and to also bore offsets to receive the shoulders or collars upon the box, and in which the hub is secured between jaws, is always held perfectly plumb and true, and is automatically centered, and the hole bored will be true and absolutely central to the hub on both ends.

The object of our invention is to produce such a machine having a range or capacity varying from a sulky-hub to the larger-sized wagon-hub, all in one machine, simply requiring a change of the boring-bar according to the size of the work.

Our invention consists in the several novel features of construction and operation hereinafter described, and which are specifically set forth in the claims annexed. It is constructed as follows:

A is the main frame, supported by legs and provided with cross-bars 1 2 3, which are elevated centrally above the plane of the body A, and upon top of the bars 1 and 3 we erect guides 4, parallel with each other, or substantially so, and upon these guides we place the table B, suitably grooved in its lower face to fit the guides, and also provided with the transverse hole to receive the screw 5, which is operated by the hand-wheel 6.

7 is a cam-lock locking the screw 5 against rotation and securing the table in any desired position.

At one side of the table we mount the stationary measuring-gage 8. Upon the rear end of the table, upon slides 9, we mount the secondary table 10, fitting upon the sides and adapted to be moved across the table by means of the hand-wheel and screw 11. In or upon this table we pivotally mount the sleeve 12, and 13 is a cam-lock to hold this sleeve in any desired position. Fitting through this sleeve and sliding therein we place the boring-bar 14, and 15 is another sleeve pivotally mounted and receiving the boring-bar and supporting its front end.

Adjacent to the gage 8 we mount the slide-rod 16, and upon this rod we mount the sleeve 17, and through this sleeve we insert the taper-measuring bar 18, secured adjustably by a set-screw in the sleeve, and upon the upper face of this bar we mark off a scale graduated into inches and fractions thereof each way from the central zero-point 19, and the top of the boring-bar is provided with a groove 20 longitudinally, and a guide-pin 21 through the sleeve 15 engages with this groove and guides the boring-bar longitudinally, at the same time preventing its rotation absolutely. The sleeve 10 may also be provided with a guide-pin or feather fitting the groove 20 in the boring-bar. Upon the rear end of the boring-bar we mount adjustably the collars 22, the inward faces of which are rounded off, substantially as shown in the drawings.

Upon the sleeve 10 we mount the longitudinal boring-gage 24, and 25 is a collar upon the boring-bar, adjustably mounted thereon and secured by a set-screw. The distance between the front face of the collar 25 and the rear face of the sleeve 10 always indicates the length of the hole to be bored, sometimes indicating the whole length of the hub and at other times the length of the swell in the bore or the depth of a recess to receive a collar upon the box or skein.

Upon the front end of the frame A we mount and secure a circular box 26, and fitting in this box is a tubular sleeve 27, provided on its rear end with an outwardly-projecting geared flange 28 and upon its front end with the rim 29, connected to the sleeve 27 by the spokes 30, the outer ends of which spokes are slotted, as at 31, longitudinally, and the outer ends of these spokes are connected by the hoop 32.

In the slots 31 we mount adjustably the jaws 33, which are designed to hold the fellies of the wheels being bored.

Upon two of the spokes 30 we mount the guides 34, and in these guides are mounted slides, to which the hub-jaws 35 are secured, the inner faces of which are made of any desired form or shape, so as to properly grip the hub between them, accommodating themselves to the taper of the exterior of the hub. The inner sides of these jaws are integral with or provided with the transversely-slotted plate 36, and upon the outer face of the sleeve 27, exterior to the spokes 30, we mount the scroll 37, in such manner that it engages with one of the slots of the plate 36, and with the rotation of the sleeve 27 the jaws are drawn inwardly toward each other to grip the hub and at the same time center it. When the hub has been so gripped and centered, the jaws 33 are adjusted so as to secure the felly of the wheel, and then with the rotation of the wheel, the rim 29, and sleeve 27, simultaneously the wheel remains locked between the jaws.

Our mechanism to feed the boring-bar through the hub consists of a pinion 38 engaging with the gear 28, which pinion rotates the shaft 39, which is the feed-bar and is mounted in suitable bearings upon the frame and threaded, as at 40, and provided with a lock-nut mechanism 41, which holds the draw-bar 42, which draw-bar is connected to the rear end of the boring-bar between the rounded faces of the nuts 22. Upon this shaft 39 we also place a hand-wheel 43, and at 44 show a lever mechanism for reversing the rotation of the shaft 39, and thus reversing the feed of the boring-bar. The pinion 38 is mounted upon a stud or pin 46 loosely, and 47 is a pinion integral with the pinion 38, or secured thereto. Upon this stud 46 we also mount a spring-frame 48, provided with an upward arm 49, carrying the pinion 50, which is always in engagement with the pinion 47, which pinion 50 is mounted loosely upon a pin projecting from the arm 49.

51 is the lower arm of the frame 48, and upon it are mounted the pinions 52, engaging with each other and with the pinion 47, and all these pinions 50 and 52 are adapted to engage with the gear 53, which is mounted on the shaft 39.

54 is another arm of the frame 48, and to this arm is connected a rod 55, the outer end of which is connected to the lever 44. This lever 44 is provided with a spring-actuated pin adapted to engage with one of the holes in the quadrant 56, and when the parts stand on the center, as shown in Fig. 2, then neither the pinions 50 or 52 are in engagement with the gear 53, and thus the feed mechanism does not operate. When the lever 44 is swung to the right, so that the pin engages with that hole in the quadrant, then the outermost pinion 52 is in engagement with the pinion 53, and when the lever 44 is thrown around to the left, the pin engaging with that hole in the quadrant, then the pinion 50 will mesh with the gear 53, and the pinion 52 will be out of engagement, and the gear 53 and shaft 39 will rotate in the opposite direction.

In the front end of the boring-bar is a mortise to receive the shank 57 of the cutting-knife, and integral with that shank is the knife 58, which knife is of circular form and tubular and beveled from the outside or cutting edge inwardly toward the center part way of the width of the ring, and thence beveled again to the inner edge of the ring, so as to give proper appearance.

Upon the cross-bar 1 we place a scale 59, and 60 is a pointer for that scale mounted upon the edge of the table or carriage B, and this scale indicates through the pointer one-half the diameter of bore through the hub or of any shoulder or swell therein as it is being bored.

To set the carriage so that it can only shift a certain distance over to the left for a certain diameter of bore, we pivot upon the side of the carriage two buttons 61 and 62, provided with the thumb-piece upon their upper end, and 63 is a bar suitably supported and perforated at either end to receive the set-screws 64 65, each of which is also provided with a lock-nut 66, and thus when one hub has been bored to a desired diameter we screw in one of the set-screws, as 65, at the same time throwing over the button 62 into a position shown in Fig. 5, when the end of the set-screw will engage with the button, and then screwing down the jam-nut 66 against the bar 63 we lock the set-screw 65, and this holds the table against farther movement to the left. Either one of the set-screws 64 or 65 can be used singly or both together, or one can be entirely dispensed with.

For use as a power-machine a belt can be applied directly to the sleeve 27, between the box 26 and geared rim 28. For use as a hand-machine the wheel can be rotated by hand after being clamped and secured in the jaws, as described.

The gage 8, in connection with the point of the gage 18 and side 17, sliding on the rod 16, is also used to determine the depth of cut or bore through a hub, the pointer being set to mark the distance through the hub, and thus the taper of the hub and its bore internally will always be uniform, no matter how many hubs are bored successively, until the gage is changed for another taper or another-sized hub.

The hand-wheel 43 may be used for reversing the feed and withdrawing the boring-tool from the hub when boring short distances, as for a collar on a skein. It will be observed, also, that when one cut has been made through a hub and the feed of the boring-bar is reversed the cutting-tool can be fed by the crank 6, operating upon the table B, so that the tool will cut a fresh cut in its backward movement, and this is effected by the use of a knife having a circular cutting-edge, and not one whose cutting-edge is a segment of a circle.

What we claim is—

1. The combination, with the main frame and its cross-bars, of a table mounted thereon and means for adjusting the table laterally, a slide mounted upon the ways upon the table and means for adjusting it laterally, a boring-bar pivotally mounted upon the table and the slide, a rod 16 mounted upon the table, a sleeve mounted and adjustable longitudinally upon the rod, and a gage-bar mounted in said sleeve and standing above the boring-bar, substantially as described.

2. The combination, with the boring-bar of a hub-boring machine having its front end pivotally mounted upon a laterally-adjustable table and its rear end pivotally mounted upon a laterally-adjustable slide mounted upon the sliding table, of a graduated gage mounted upon the slide and standing parallel to the boring-bar, and means for regulating the length of the cut of the boring-bar, substantially as described.

3. The combination, with the boring-bar of a hub-boring machine having its front end pivotally mounted upon a laterally-adjustable table and its rear end pivotally mounted upon a laterally-adjustable slide mounted upon the said table, of a graduated gage mounted upon the slide and standing parallel to the boring-bar to regulate the length of the cut, and a gage to regulate the taper, consisting of a rod 16, mounted upon the sliding table, a sleeve mounted and adjustable longitudinally upon the rod, and a graduated gage-bar mounted in said slide and standing transverse to the boring-bar, substantially as described.

4. The combination, with the main frame of a hub-boring machine having cross-bars provided with slideways, of a table mounted thereon and adjustable transversely to the main frame, a slide mounted upon the transverse ways upon the top of the table and adjustable transversely to and independent of the table, and a boring-bar having its front end pivotally mounted upon the table and its rear end pivotally mounted upon the slide and carried transversely with the movement of the slide, substantially as described.

5. The combination, with the boring-bar of a hub-boring machine having its front end pivotally mounted upon a laterally-adjustable table and its rear end pivotally mounted upon a laterally-adjustable slide mounted upon ways across the top of the table and carried laterally by the transverse movement of the slide, of a graduated gage mounted upon the slide and standing parallel to the boring-bar to regulate the length of the cut, and a gage to regulate the taper, consisting of a rod 16, mounted upon the sliding table, a sleeve mounted upon the table-rod and adjustable longitudinally thereon, and a doubly-graduated gage-bar mounted in said sleeve and standing transverse to the boring-bar, and a bore-regulator consisting of a graduated gage stationary upon a cross-bar of the main frame, and a pointer secured to the edge of the sliding table and moving therewith adjacent to the gage, substantially as described.

6. The combination, with the stationary main frame having cross-bars provided with slideways, a table mounted thereon and adjustable transversely upon the main frame, a slide mounted upon transverse ways upon the top of the table and adjustable transversely to and independent of the table, and a boring-bar having its front end pivotally mounted upon the table and its rear end pivotally mounted upon the slide and carried transversely with the movement of the slide, said bar being non-revoluble in its supports, but movable longitudinally therein, a graduated gage mounted upon the slide and parallel to the boring-bar to regulate the cut, a gage to regulate the taper, consisting of a rod 16, mounted upon the sliding table, a sleeve upon the rod and adjustable longitudinally thereon, and a doubly-graduated gage-bar mounted in said sleeve and standing transverse to the boring-bar, and a boring-gage consisting of a graduated plate stationary upon a cross-bar of the main frame, and a pointer secured to the edge of the sliding table, with a sleeve to receive the hub mounted upon the main frame, a scroll mounted and rotating upon the front end of the sleeve, and gripping-jaws having grooves across their inner faces engaging with the scroll and actuated by the rotation thereof, substantially as described.

7. The combination, with the stationary main frame having cross-bars provided with slide-ways, a table mounted thereon and adjustable transversely upon the main frame, a slide mounted upon transverse ways upon the top of the table and adjustable transversely to and independent of the table, and a boring-bar having its front end pivotally mounted upon the table and its rear end pivotally mounted upon the slide and carried transversely with the movement of the slide, said bar being non-revoluble in its bearings, but movable longitudinally therein, a graduated cut-regulating gage mounted upon the slide and parallel to the boring-bar, a gage for the taper, consisting of a rod 16, mounted upon the sliding table, a sleeve upon the rod and adjustable longitudinally thereon, and a doubly-graduated gage-bar mounted in said sleeve and standing transverse to the boring-bar, and a boring-gage consisting of a graduated plate stationary upon a cross-bar of the main frame, and a pointer secured to the side of the sliding table, of a sleeve to receive the hub mounted upon the main frame, a scroll mounted and rotating upon the front end of the sleeve, and gripping-jaws having grooves across their inner faces engaging with the scroll and actuated by the rotation thereof, and a gear adjacent to the front of the sliding table, mounted upon the feed-bar and engaging with the geared rim upon the hub-sleeve, a threaded feed-bar mounted in bearings in the main frame and rotated and moved longitudinally forward and back therein by the rotation of the hub-sleeve, and a draw-bar connecting the feed-bar to the boring-bar and transmitting the feed movement to the boring-bar, substantially as described.

8. The combination, with the boring-bar and the feed-bar, of the collars adjustably mounted upon the boring-bar and provided with rounded inner faces, and the draw-bar adjustably connected to the feed-bar at one end and fitting over the boring-bar at the other end between the rounded faces of the collars, substantially as described.

9. The combination, with the geared rim of the hub-sleeve, of the feed-reversing mechanism, comprising the gear 38 on the feed-bar, the pinion 47 integral with the gear 38, the frame 48, provided with arms 49, 51, and 54, the pinion 50, journaled upon the arm 49 and engaging with the pinion 47, the pinions 52, journaled upon the arm 51 and engaging with each other and with the gear 53 on the shaft 39, and the shifting-rod connected to the lever 44, which adjustably engages with the quadrant 56 and swings the frame 48, changing the engagement of the pinions, substantially as described.

10. The combination, with the boring-bar, of a knife secured therein and provided with a circular cutting-edge and an open center and beveled, substantially as described.

In witness whereof we have hereunto set our hands this 4th day of April, 1889.

WILLIAM E. KANE.
FRANK T. WEIDAW.

In presence of—
H. P. DENISON,
C. W. SMITH.